July 27, 1954 R. K. STEINBERG 2,685,049

COINCIDENCE CIRCUIT

Filed Oct. 31, 1951 2 Sheets-Sheet 1

INVENTOR
RICHARD K. STEINBERG
BY Dwight D. Mooney
ATTORNEY

July 27, 1954 R. K. STEINBERG 2,685,049

COINCIDENCE CIRCUIT

Filed Oct. 31, 1951 2 Sheets-Sheet 2

INVENTOR
RICHARD K. STEINBERG
BY Dwight D. Mooney
ATTORNEY

Patented July 27, 1954 2,685,049

UNITED STATES PATENT OFFICE 2,685,049

COINCIDENCE CIRCUIT

Richard K. Steinberg, Poughkeepsie, N. Y., assignor to International Business Machines Corporation, New York, N. Y., a corporation of New York Application October 31, 1951, Serial No. 254,140

7 Claims. (Cl. 315—166)

This invention relates to electronic circuits and more particularly to a novel electronic coincidence circuit arrangement for performing conventional AND and OR functions.

A conventional type AND or OR circuit employs vacuum diodes and another conventional type employs crystal diodes. The use of vacuum diodes requires a large amount of power to heat the cathodes. On the other hand, crystal diodes are relatively expensive and withstand only a limited voltage in the reverse direction which places a limitation on the amplitude of the input signals which may be successfully applied. Also, the successful operation of such circuits employing crystal diodes is limited by the relatively low back resistance of such diodes.

In such circuits it is often desirable that the output voltage swing be substantially the same as the input voltage swing. In ordinary gaseous diodes the breakdown voltage and sustaining voltage are of different values. It has been found that this difference causes a difference in the input and output voltage swings. If the breakdown-sustaining voltage difference is more than the amplitude of the input voltage signal the output voltage may not follow the input voltage at all. Hence, if low amplitude input voltage signals must be used this voltage difference is of critical importance.

Accordingly, a principal object of the invention is to provide a novel coincidence circuit wherein the above disadvantages are completely eliminated or substantially minimized.

Another object is to provide a novel coincidence circuit utilizing elements having a higher back resistance than crystal diodes and providing for successful operation over a wider range of voltage values.

Another object is to provide a coincidence circuit utilizing elements having a back resistance and reverse voltage rating substantially independent of temperature and changes in temperature.

A further object is to provide a novel coincidence circuit using gaseous diodes wherein the output bias voltage of the circuit is independent of the sustaining voltages of the diodes.

A still further object is to provide a novel coincidence circuit using a gaseous tube of the glow transfer type wherein the operable response of the circuit is independent of the deionization time of the tube.

Another object is to provide a coincidence circuit operable in response to a transfer of at least one glow discharge in a gaseous discharge tube of the glow transfer type wherein the switching action or time of circuit response is not limited by the time consumed in actually effecting a transfer of the glow discharge.

A still further object is to provide a novel coincidence circuit wherein a gaseous discharge device of the glow transfer type having a plurality of anodes and a common cathode is employed to effect circuit response.

Other objects of the invention will be pointed out in the following description and claims and illustrated in the accompanying drawings, which disclose, by way of example, the principle of the invention and the best mode, which has been contemplated, of applying that principle. Other embodiments of the invention employing the same or equivalent principle may be used and structural changes made as desired by those skilled in the art without departing from the present invention and within the spirit of the appended claims.

Figures 1, 2, 3:
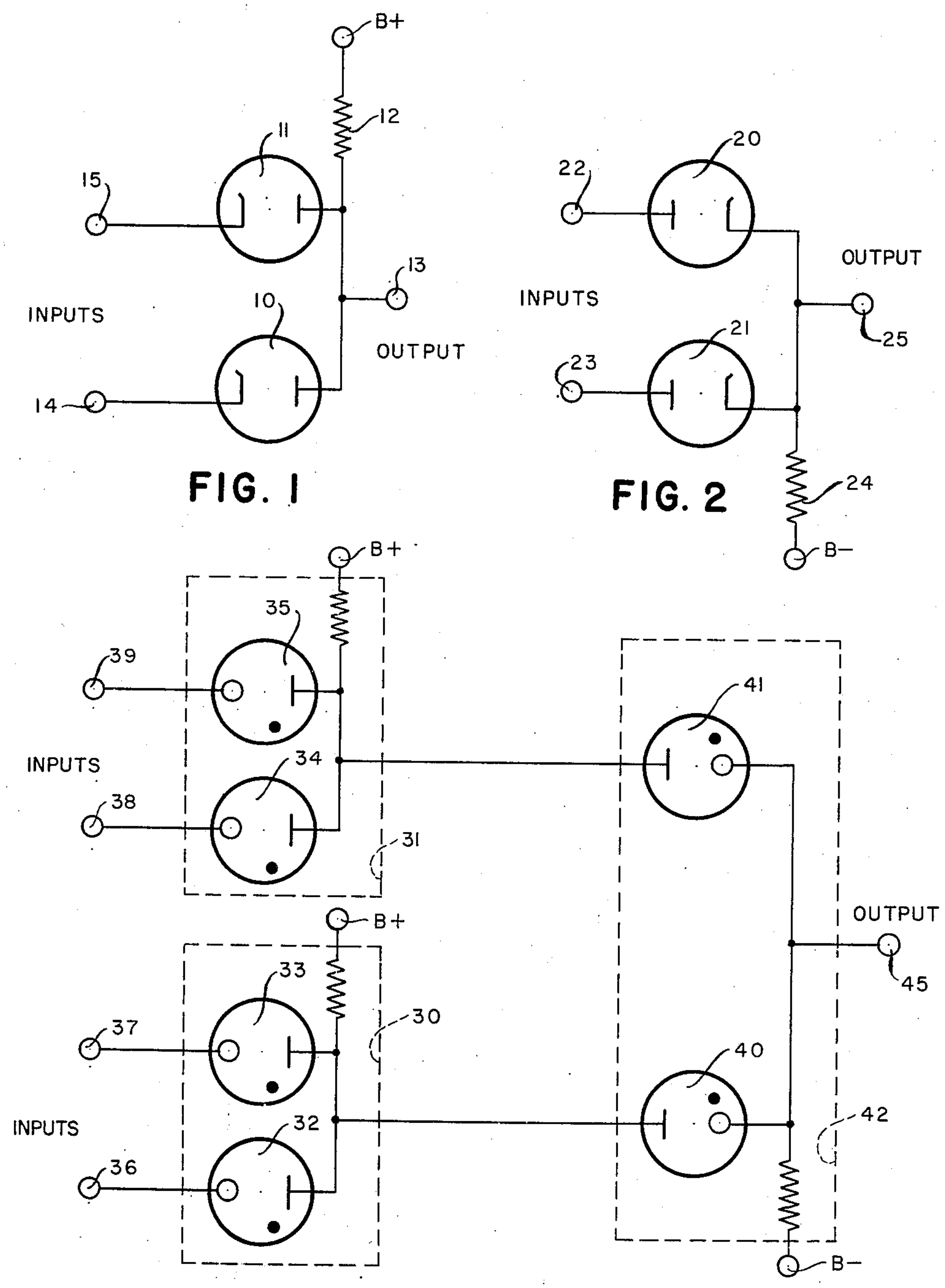
Fig. 1 is a circuit diagram of an AND circuit employing two vacuum diode tubes.
Fig. 2 is a circuit diagram of an OR circuit employing two vacuum diode tubes.
Figure 4:
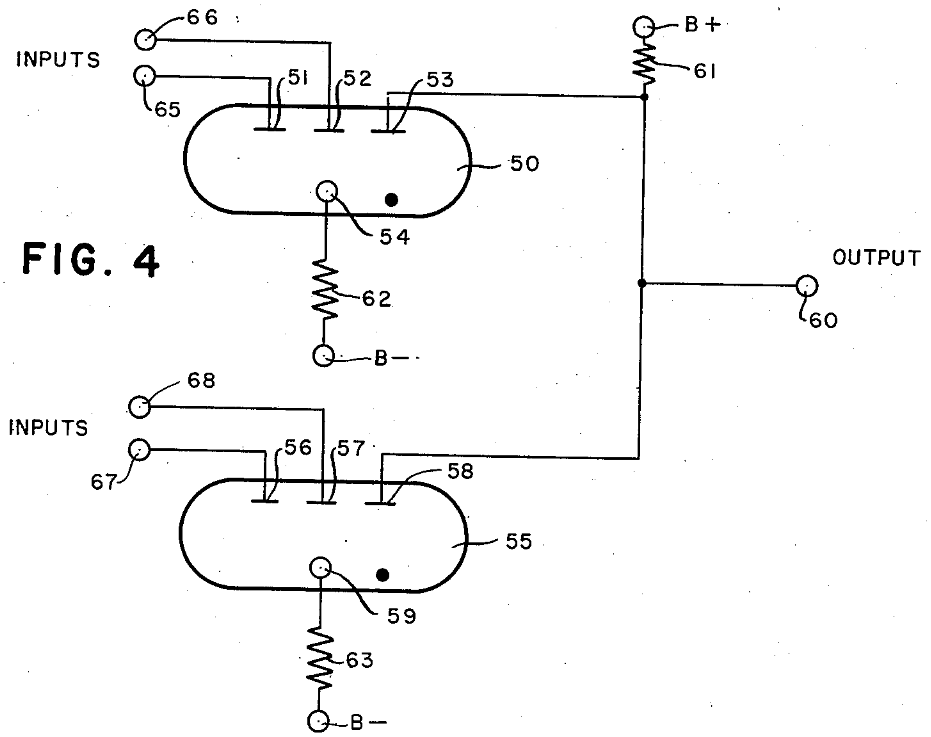
Figure 5:
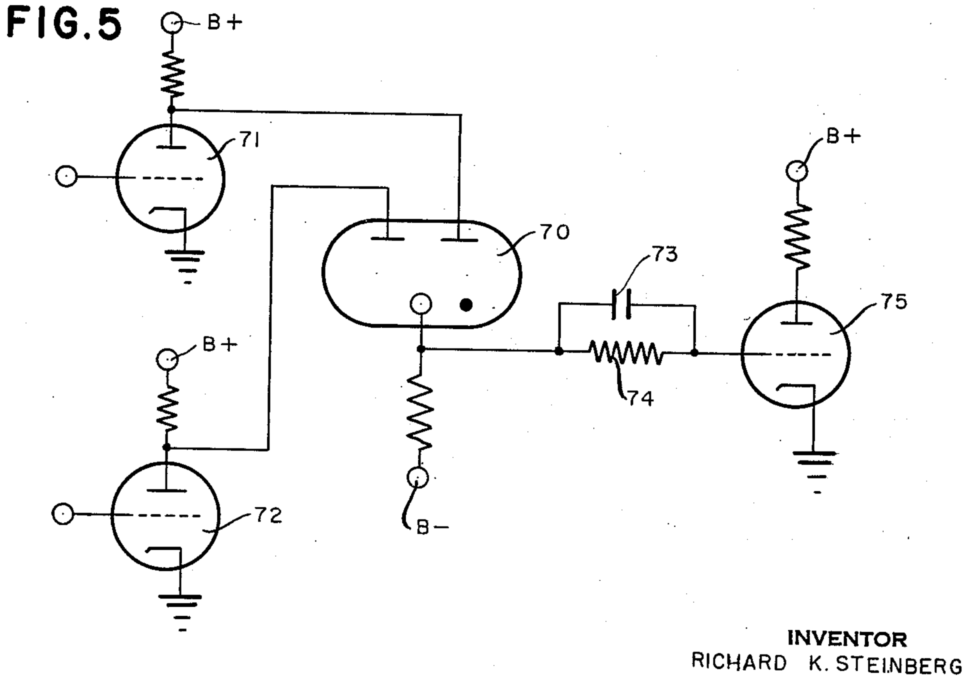

Fig. 3 is a circuit diagram of a coincidence circuit of one embodiment of the invention employing gaseous diodes wherein two AND circuits serve as the inputs to a single OR circuit, Fig. 4 is a circuit diagram of another embodiment of the invention including a novel coincidence circuit wherein preselected glow transfer is effected to initiate response of the circuit, and Fig. 5 is a circuit diagram of a still further embodiment of the invention.

Briefly, one embodiment of the invention comprises a coincidence circuit employing a gaseous discharge tube of the glow transfer type wherein the deionization time normally required to extinguish a glow discharge is not a factor limiting the operable speed of the circuit. The glow transfer tube employed has a plurality of anodes and a single common cathode; a glow discharge always exists within the tube. Input signals effect a preselected glow transfer to cause circuit response. Such an arrangement using a common cathode insures a uniform sustaining voltage and decreases the difference between the breakdown and sustaining voltage as compared to the conventional gaseous diode tube. This decrease permits the output bias voltage to follow the input bias voltage even when small amplitude input signals are employed.

Referring more particularly to Fig. 1, two diode vacuum tubes 10 and 11 have their anodes commonly connected through a resistor 12 to a source of positive voltage designated B+. These anodes are also commonly connected to an output terminal 13. The cathodes of the tubes 10 and 11 are connected to the input terminals 14 and 15 respectively to which separate input voltages may be applied.

If the voltage at both input terminals 14 and 15 is low relative to the B+ voltage the tubes 10 and 11 will be conductive and the output voltage at terminal 13 will be higher than the voltage at the input terminals by an amount equal to the voltage drop across the tubes 10 and 11. Now, if the voltage at either input terminal is increased so that the conduction through the tube connected thereto is substantially decreased or cut off the voltage at the output terminal 13 is substantially unchanged since the resistance 12 is large as compared to the forward resistance of the tubes 10 and 11. Hence, if the voltage at the input terminal 14 is so increased current flows from the B+ terminal through the resistance 12 and diode tube 11 to the input terminal 15. The voltage at the cathode of the tube 10 is high relative to that at its anode and the tube presents a high resistance to voltages of this polarity.

If the voltage at both input terminals is increased simultaneously, current flow through both the tubes 10 and 11 is substantially decreased or cut off and the voltage at the output terminal 13 accordingly increased to a value approaching that of the B+ terminal. Since an increased or positive voltage must be applied simultaneously to the input terminals 14 and 15 to produce an output at the output terminal 13 this circuit is commonly referred to as an AND circuit.

Referring to Fig. 2, diode tubes 20 and 21 have their anodes connected to the input terminals 22 and 23 respectively, The cathodes of the tubes 20 and 21 are commonly connected through a resistance 24 to a source of negative voltage designated B—. These cathodes are also commonly connected to an output terminal 25. If both input terminals 22 and 23 are at a voltage higher or more positive than B— then both tubes will be conductive and the voltage at the output terminal 25 will be only slightly lower than that at the input terminals. This is because of the low resistance of the tubes 20 and 21 in the forward direction which thereby causes only a small voltage drop across those tubes. Now, it follows from the above that if the voltage at either input terminal 22 or 23 is increased the voltage at the output terminal is increased a substantially corresponding amount. Suppose, for example, that the voltage at the input terminal 22 is increased. The current flowing through the tube 20 connected thereto is increased. The voltage at the output terminal 25 and cathodes of the tubes 20 and 21 is increased. Finally, the cathode of the tube 21 becomes positive relative to its plate and negligible current flows through the tube 21 because of its high back resistance. Since an increased voltage at either input terminal 22 and 23 results in an increased voltage at the output terminal 25, this circuit is commonly referred to as an OR circuit.

Referring to Fig. 3 each of the circuit arrangements enclosed within the dotted lines 30 and 31 comprise AND circuits. Input terminals 36 and 37 are provided for the circuit enclosed by line 30 and input terminals 38 and 39 are provided for the circuit enclosed by the line 31. Each of these circuit arrangements is identical with that shown in Fig. 1 except that gaseous diode tubes are employed in the place of vacuum diode tubes used in Fig. 1.

Now, the output voltage at the commonly connected anodes of the gaseous diodes exceeds the input voltage by an amount equal to the sustaining voltage required to sustain a glow discharge within the tubes. Hence, by way of example, if the input voltage at the terminals 36 and 37 is —30 volts and the sustaining voltage is 70 volts then the output voltage at the commonly connected plates of the tubes 32 and 33 is —30 volts plus 70 volts or +40 volts.

If the voltage applied to input terminal 36 is increased the glow discharge in the tube 32 will be extinguished but the voltage at the commonly connected anodes of the tubes 32 and 33 will remain substantially unchanged because of the glow discharge still existing within the tube 33. If an increased voltage is applied to the input terminals 36 and 37 so as to tend to simultaneously extinguish the glow discharges within the tubes 32 and 33, the output voltage at the commonly connected anodes will increase by an amount equal to the increase applied to the input terminals. However, if the amplitudes of the increased voltages simultaneously applied to the terminals 36 and 37 are unequal the increase of the output voltage would be equal to the amplitude of the lesser of the two input voltages. The output voltage cannot rise above B+ because, if the difference in voltage between the input terminals and B+ becomes less than the sustaining voltage of the gaseous diodes, the glow discharges will be extinguished.

The high resistance of the gaseous tube when applied voltage is less than the sustaining voltage is extremely important in that it permits successful operation of the coincidence circuits over a wide range of values not possible when crystal diode tubes are used as essential circuit elements.

Suppose, for example, that if the input voltage was increased from a value of —30 volts to a value of +40 volts the cathode and anode of the corresponding tube are at the same voltage. Under such conditions the current through the diode would be zero. If this voltage is increased to a value slightly less than +40 volts, negligible current flows through the tube because of the high resistance exhibited by the gaseous diode when the voltage applied thereto is less than the sustaining voltage. In a crystal diode, for example, the back resistance is usually less than one megohm and the application of such voltages thereto, as recited immediately above, allows objectionable current to flow through the diode.

Now, when gaseous diodes are employed the amplitude of the input pulse which may be applied is much greater than that which is permissible when crystal diodes are employed. It has been found that when gaseous diodes are employed the limit of the amplitude of the input pulse which may be applied and successful operation still obtained is approximately equal to the sum of the sustaining voltages of the gaseous diodes in the forward and reverse or back direction. If the cathode of the gaseous diode is positive relative to its anode the reverse or back sustaining voltage required to maintain a discharge is greater than the forward sustaining voltage by an amount dependent upon the relative natures of the cathode and anode surfaces. If the forward sustaining voltage is 70 volts as assumed above and the back sustaining voltage is 90 volts, then if the input voltage at terminal 36 is increased more than 160 volts, that is, from −30 volts to more than +130 volts, a current will flow from the input terminal 36 through the tubes 32 and 33 to the input terminal 37. Since such is objectionable the increased voltage of 160 volts would be considered the maximum voltage change to which the circuit is operably responsive. This illustration of the operating principle is not representative of the operating limits of gaseous diodes for such tubes having a sustaining voltage of 200 volts are readily available. Hence with such a tube an input voltage of approximately 400 volts would result in successful operation of the circuit. Such illustrates the tremendous practical advantage to be realized from the use of gaseous diodes especially when it is remembered that only a few selected crystal diodes operate successfully when the input voltage is increased as much as 100 volts.

The gaseous diodes 40 and 41 are connected as the vacuum tubes 20 and 21 of Fig. 2 to form an OR circuit enclosed by the dotted line 42. The inputs to the tubes 40 and 41 are obtained from the outputs of the circuits 30 and 31 respectively as shown. As in Fig. 2 an increase of the voltage applied to the anode of either of the tubes 40 and 41 causes an increase in the voltage at the output terminal 45. As shown, the two AND circuits 30 and 31 are connected so that either when energized will provide an input to the OR circuit 42. Obviously, any one of these circuits may be enlarged to include three or more inputs and they may be interconnected in a multiplicity of ways to achieve the desired results.

In Fig. 3 a coincidence circuit is provided wherein the bias voltage at the output is equal to the bias voltage at the input. Such is readily appreciated from the following. The output bias voltage of the AND circuits 30 and 31 is greater than the input bias voltage by an amount equal to the sustaining voltage of the gaseous diodes associated with each. The output bias voltage of the AND circuits is the input bias voltage for the OR circuit 42 and the output bias voltage of the OR circuit appearing at terminal 45 is less than its input bias voltage by an amount equal to the sustaining voltage of the gaseous diodes 40 and 41. Hence, if the input voltage swing to the AND circuits is from −30 to +20 volts the output voltage swing at terminal 45 is from −30 to +20 volts. Hence, in this coincidence circuit the output bias voltage is independent of the sustaining voltage of the gaseous diodes. These conditions exist only if the values of the breakdown and sustaining voltages of the diodes are substantially equal. Such is not always the case, however, when single gaseous diodes are employed.

In view of the above explanation it is clear that one of the tubes 34, 35 or 41 is always conductive irrespective of the particular combination of input voltages applied. Hence, at all times, a glow discharge is present in at least one of the tubes. Similarly, a glow discharge is present at all times in at least one of the tubes 32, 33 or 40.

Referring to Fig. 4, two OR circuits and a single glow discharge path for an AND circuit are included in the envelope 50. Three anodes, 51, 52 and 53 are employed in conjunction with a single cathode 54. Likewise, two OR circuits and a single glow discharge path for an AND circuit are included in the envelope 55. Three anodes, 56, 57 and 58 are employed in conjunction with a single cathode 59. The anodes 53 and 58 are commonly connected to output terminal 60 and through a resistor 61 to a suitable source of B+ voltage. The cathodes 54 and 59 are connected through resistors 62 and 63, respectively, to sources of suitable negative voltages designated B−.

The input terminals 65, 66, 67 and 68 are connected to the anodes 51, 52, 56 and 57, respectively, of the tubes 50 and 55.

In operation, the cathode 54 and anodes 51 and 52 function as one OR circuit and the cathode 59 and anodes 56 and 57 function as the other OR circuit. The cathode 54 and anode 53 and the cathode 59 and anode 58 function as the AND circuit. When in the zero or starting condition a glow discharge exists between the cathode 54 and anode 53 and a glow discharge exists between the cathode 59 and anode 58. Actually, there is also a small current flow between the anodes 51 and 52 and the cathode 54 and between the anodes 56 and 57 and the cathode 59.

Now, if a positive voltage is applied to the input terminal 66 the current will be increased between the cathode 54 and the anode 52. If a similar positive voltage is applied to the terminal 68 the current will be increased between the cathode 59 and anode 57. The existence of the additional current between the anode 52 and cathode 54 and between the anode 57 and cathode 59 causes an additional current flow through the respective cathodes and a corresponding increase of the cathode voltages. Since, the voltage drop existing in the tubes 50 and 55 is substantially independent of the current flow the voltage at the output terminal 60 or commonly connected anodes 53 and 58 is also increased. When the input voltage applied to one of the terminals 66 or 68 is removed the voltage at the corresponding cathode decreases and the voltage at the output terminal 60 also decreases. The application of such an input voltage to either or both of the terminals 65 and 66 simultaneously with the application of such an input voltage to either or both of the terminals 67 and 68 causes a similar operation.

Now, it should be noted that a glow discharge exists in each tube 50 and 55 at all times and that each tube responds to an input to either OR circuit almost instantaneously by exhibiting change in glow current between the common cathode and the anode connected to that input. In no case is there a delay because of the normal deionization time required to extinguish a glow discharge in the conventional gaseous discharge tube. Here, the speed of operation is limited only by the time necessary to shift the glow discharge current from one anode to another and the time necessary to increase or decrease the current flow through a previously established glow discharge. In actual practice this switching action occurs in a few tenths of a microsecond. It is probable that this time can be considerably decreased since the limiting factor has been found to be the charging of stray capacitances by the current present and not in effecting the actual transfer of the glow discharge. Hence, the use of a common cathode in cooperative glow discharge relation to a plurality of anodes makes possible the increased switching speed because a glow discharge between one anode and a common cathode is used to initiate another glow discharge between that cathode and another anode. This action makes the difference between the breakdown and sustaining voltages very small. This small difference permits the output voltage swing to follow the input voltage swing even when a small amplitude input is employed.

If the circuit of Fig. 4 is rendered responsive by negative input voltages, it is obvious that as shown such would illustrate two AND circuits whose outputs are operating a single OR circuit whose output appears at the terminal 60. Here, the use of a common cathode completely eliminates the problem of trying to obtain two or more cathodes in the same tube having the same sustaining voltages. This is obvious since the operation of each of the tubes 50 and 55 is completely independent of the other both as to their input and output.

It is understood that the arrangement and configuration of the electrodes within the envelope of the tube may take any of a variety of forms and that a single anode common to a plurality of cathodes also may be employed. It is advantageous to place all of the electrodes (of the tubes 50 and 55) in a single envelope in that any change in the sustaining voltage caused by a change in the composition or pressure of the gaseous atmosphere will occur equally for all electrodes. However, it would be necessary to isolate the two groups of electrodes (those of tube 50 from those of tube 55) to prevent spurious glow discharge. Such an isolation might be obtained through the use of mica partitions between the two groups of electrodes. It has been found, however, that such causes complication of the tube structure to such an extent that the advantage is offset. Generally, it is advantageous to place all tubes having a common cathode or a common anode in a single envelope. It appears that a further combinational unitary structure would be worthwhile only in very special cases.

While the above emphasizes the advantages of preventing a change in the bias voltage such a change is desirable in some cases. Fig. 5 shows a circuit diagram illustrating the advantage of such a change. The glow transfer tube 70 includes two anodes and a common cathode and is operated as an electronic switch or OR circuit. The anodes of the respective tubes 71 and 72 are connected to the respective anodes of the tube 70. The tubes 71 and 72 represent inverters or any type of electronic switching circuit such as Eccles-Jordan trigger circuits, the tubes 71 and 72 are normally conductive so that the voltages normally applied to the anodes of the tube 70 are insufficient to create a glow discharge between the respective anodes and the common cathode. When the voltage at the anodes of either of the tubes 71 and 72 is sufficiently increased due to a change in the conductive condition of that tube a glow discharge is created between the corresponding anode and common cathode of the tube 70. The increased voltage at the common cathode of the tube 70 is transferred through the capacitor 73 and the resistor 74 to the control grid of the tube 75 to render it conductive. Hence, the change in the cathode bias of the tube 70 caused by its conduction makes it possible to drive the grid of the tube 75 directly without the use of a voltage divider and the resulting loss in the amplitude of the signal amplitude accompanying such. The resistor 74 is provided to limit the grid current of the tube 75 to a safe value and the capacitor 73 connected in parallel to the resistor 74 is provided to prevent undue delay in the application of the signal to the grid of the tube 75.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A coincidence circuit including, a first gaseous discharge tube of the glow transfer type having a plurality of anodes and a single cathode common thereto; a second gaseous discharge tube of the glow transfer type having a plurality of anodes and a single cathode common thereto; a common output connection between one anode of each tube and a source of positive voltage; a connection from each cathode to a source of negative voltage so that a glow discharge normally exists between that cathode and the anode thereof connected to an anode of the other tube; and input means connected to the two remaining anodes of each tube so that an input to any anode produces a glow discharge between the common cathode and that anode thereby producing a voltage change at the commonly connected anodes when a glow discharge exists to at least one of the said remaining anodes of each tube.

2. A circuit responsive to simultaneous pulse occurrence including a source of pulses; a gaseous discharge tube of the glow transfer type having a single electrode of one functional type and a plurality of electrodes of another functional type; first circuit means connected to establish a glow discharge in said tube prior to pulse occurrence; and second circuit means connected to said tube and to said source to convey pulses to said tube to effect an additional glow discharge therein whereby the response of said circuit is independent of deionization within said tube.

3. In a coincidence circuit a gaseous discharge tube including a single electrode of one functional type and a plurality of electrodes of another functional type; an electron tube connected to each of said plurality of electrodes to establish a glow discharge between that electrode and said single electrode when said tube is rendered responsive; and a grid controlled electron tube having its control grid connected to said single electrode to transfer an electrical change from the latter to the former whereby the grid controlled electron tube is rendered responsive when a glow discharge exists in said gaseous discharge tube.

4. A coincidence circuit having first and second OR circuits each including input means, a plurality of electrodes in a gaseous atmosphere, a separate connection from said input means to functionally similar electrodes to provide a glow discharge between that electrode and an electrode of another functional type when an input is applied to the former and an AND circuit including a plurality of electrodes in a gaseous atmosphere and having a plurality of electrodes of the same functional type, an output connection from a single or commonly connected electrode of said another functional type, whereby a glow discharge to each of said plurality of electrodes of the same functional type causes an electrical change at said output connection.

5. In a pulse responsive electronic circuit a gaseous discharge tube of the glow transfer type including a single electrode of one functional type and a connection therefrom to a source of D. C. voltage; at least three electrodes of another functional type; a connection from one of said three electrodes to a source of D. C. voltage to thereby establish a glow discharge between that electrode and said single electrode; an output terminal connected to said one of said three electrodes; input connections each from a source of input pulses to a different one of the remaining of said three electrodes to change the potential difference between that electrode and said single electrode to establish a glow discharge therebetween.

6. The invention set forth in claim 5 including a second and similarly connected glow transfer tube except that the said one of three electrodes of each tube is commonly connected to exhibit an output only when an input pulse is applied simultaneously through at least one input connection to each tube.

7. A coincidence circuit including a pair of gaseous discharge tubes each having a plurality of electrodes of one functional type and a single electrode of another functional type, a common output connection between an electrode of said one functional type in each of said tubes and one terminal of a source of voltage, a circuit connection between said electrodes of another functional type and the other terminal of said source of voltage, and input circuit means coupled to the remaining electrodes of said one functional type of each said tube.

References Cited in the file of this patent

UNITED STATES PATENTS

| Number | Name | Date |
|---|---|---|
| 2,505,006 | Reeves | Apr. 25, 1950 |
| 2,516,915 | Reeves | Aug. 1, 1950 |
| 2,553,585 | Hough | May 22, 1951 |
| 2,565,103 | Toulon | Aug. 21, 1951 |